US008912273B2

(12) United States Patent
Venkatesh et al.

(10) Patent No.: US 8,912,273 B2
(45) Date of Patent: Dec. 16, 2014

(54) PROCESS FOR THE PREPARATION OF AN AQUEOUS POLYMER DISPERSION

(75) Inventors: Rajan Venkatesh, Mannheim Neckarstadt-Ost (DE); Vijay Immanuel Raman, Mannheim (DE)

(73) Assignee: BASF SE, Ludwigshafen (DE)

( * ) Notice: Subject to any disclaimer, the term of this patent is extended or adjusted under 35 U.S.C. 154(b) by 293 days.

(21) Appl. No.: 12/997,259

(22) PCT Filed: Jun. 3, 2009

(86) PCT No.: PCT/EP2009/056766
§ 371 (c)(1),
(2), (4) Date: Dec. 10, 2010

(87) PCT Pub. No.: WO2009/153162
PCT Pub. Date: Dec. 23, 2009

(65) Prior Publication Data
US 2011/0092635 A1    Apr. 21, 2011

(30) Foreign Application Priority Data

Jun. 17, 2008 (EP) ..................................... 08158422

(51) Int. Cl.
| | | |
|---|---|---|
| C08F 220/06 | (2006.01) | |
| C08F 220/10 | (2006.01) | |
| C08F 228/02 | (2006.01) | |
| C08F 2/38 | (2006.01) | |
| C08F 2/22 | (2006.01) | |
| C08F 4/00 | (2006.01) | |
| C08F 293/00 | (2006.01) | |
| C08L 53/00 | (2006.01) | |
| C09D 153/00 | (2006.01) | |
| C09J 153/00 | (2006.01) | |

(52) U.S. Cl.
CPC ... *C08F 2/38* (2013.01); *C08F 2/22* (2013.01); *C08F 4/00* (2013.01); *C08F 293/005* (2013.01); *C08L 53/00* (2013.01); *C09D 153/00* (2013.01); *C09J 153/00* (2013.01); *C08F 2438/03* (2013.01)
USPC .......... 524/547; 524/556; 524/700; 526/287; 526/288; 526/329.5

(58) Field of Classification Search
None
See application file for complete search history.

(56) References Cited

U.S. PATENT DOCUMENTS

| | | | |
|---|---|---|---|
| 5,994,457 A | 11/1999 | Stanger et al. | |
| 6,380,335 B1 | 4/2002 | Charmot et al. | |
| 6,403,745 B1 * | 6/2002 | Scherer et al. | 526/319 |
| 6,433,132 B1 | 8/2002 | Wood et al. | |
| 6,569,969 B2 | 5/2003 | Charmot et al. | |
| 6,596,899 B1 | 7/2003 | Lai | |
| 6,747,111 B2 * | 6/2004 | Chiefari et al. | 526/329.2 |
| 7,230,063 B1 * | 6/2007 | Parker | 526/346 |
| 2002/0058770 A1 | 5/2002 | Charmot et al. | |
| 2002/0058771 A1 | 5/2002 | Chang et al. | |
| 2002/0061990 A1 | 5/2002 | Charmot et al. | |
| 2002/0061991 A1 | 5/2002 | Charmot et al. | |
| 2002/0065380 A1 | 5/2002 | Charmot et al. | |
| 2006/0142404 A1 * | 6/2006 | Berge et al. | 521/142 |
| 2006/0223936 A1 * | 10/2006 | Such et al. | 524/555 |
| 2008/0139764 A1 | 6/2008 | Le et al. | |
| 2008/0139836 A1 | 6/2008 | Le et al. | |

FOREIGN PATENT DOCUMENTS

| | | |
|---|---|---|
| DE | 196 24 299 | 1/1997 |
| DE | 196 21 027 | 11/1997 |
| DE | 197 41 184 | 3/1999 |
| DE | 197 41 187 | 3/1999 |
| DE | 198 05 122 | 4/1999 |
| DE | 198 28 183 | 12/1999 |
| DE | 198 39 199 | 3/2000 |
| DE | 198 40 586 | 3/2000 |
| DE | 198 47 115 | 5/2000 |
| EP | 0 771 328 | 10/1998 |
| WO | 98 01478 | 1/1998 |
| WO | 03 055919 | 7/2003 |
| WO | 2006 122344 | 11/2006 |
| WO | 2008 009997 | 1/2008 |

OTHER PUBLICATIONS

Gaillard et al. J. Polym. Sci.: Part A: Polym. Chem., 41, 2003, 684-698.*
Ladaviere et al. Macromolecules 2001, 34, 5370-5372.*
International Search Report issued Sep. 11, 2009 in PCT/EP09/56766 filed Jun. 3, 2009.
Krstina, Julia et al., "Narrow Polydispersity Block Copolymers by Free—Radical Polymerization in the Presence of Macromonomers", Macromolecules, vol. 28, No. 15, pp. 5381-5385, (1995).
Monteiro, J. Michael: "Design Strategies for Controlling the Molecular Weight and Rate Using Reversible Addition-Fragmentation Chain Transfer Mediated Living Radical Polymerization", Journal of Polymer Science: Part A: Polymer Chemistry, vol. 43, pp. 3189-3204, (2005).
Rizzardo, Ezio et al., "RAFT Polymerization in Bulk Monomer or in (Organic) Solution", Wiley-VCH Verlag GMBH & Co., KGaA, Weinheim, pp. 189-234, (2008).

(Continued)

*Primary Examiner* — Vu A Nguyen
(74) *Attorney, Agent, or Firm* — Oblon, Spivak, McClelland, Maier & Neustadt, L.L.P.

(57) ABSTRACT

Process for the preparation of an aqueous polymer dispersion using RAFT compounds.

13 Claims, No Drawings

(56) References Cited

OTHER PUBLICATIONS

Ferguson, J. Christopher et al., "Effective ab Initio Emulsion Polymerization under RAFT Control", Macromolecules, vol. 35, No. 25, pp. 9243-9245, (Dec. 3, 2002).

Ferguson, J. Christopher et al., "Ab Initio Emulsion Polymerization by RAFT-Controlled Self-Assembly", Macromolecules, vol. 38, No. 6, pp. 2191-2204, (2005).

Moad, Graeme et al., "Living Radical Polymerization by the RAFT Process", Australian Journal of Chemistry, vol. 58, No. 6, pp. 379-410, (2005).

U.S. Appl. No. 13/503,753, filed Apr. 24, 2012, Lauter, et al.
U.S. Appl. No. 13/580,039, filed Aug. 20, 2012, Raman, et al.
U.S. Appl. No. 13/318,964, filed Nov. 4, 2011, Raman, et al.
U.S. Appl. No. 13/318,911, filed Nov. 4, 2011, Raman, et al.

* cited by examiner

PROCESS FOR THE PREPARATION OF AN AQUEOUS POLYMER DISPERSION

CROSS REFERENCE TO RELATED APPLICATION

This application is a 371 of PCT/EP09/056766, filed on Jun. 3, 2009, and claims priority to European Patent Application No. 08158433.9, filed on Jun. 17, 2008.

The present invention relates to a process for the preparation of an aqueous polymer dispersion by free radical polymerization of ethylenically unsaturated monomers in the presence of at least one free radical initiator and at least one RAFT compound in an aqueous polymerization medium, ≥1 and ≤80% by weight of at least one ethylenically unsaturated monomer having a solubility of ≥200 g per 1000 g of dionized water at 20° C. and 1 atm (absolute) [monomers A], and ≥20 and ≤99% by weight of at least one ethylenically unsaturated monomer having a solubility of ≤100 g per 1000 g of dionized water at 20° C. and 1 atm (absolute) [monomers B]

being used for the polymerization and the monomers A and B summing to 100% by weight (total amount of monomers), ≥0.1 and ≤5% by weight of at least one RAFT compound and ≥0.01 and ≤5% by weight of at least one free radical initiator, based in each case on the total amount of monomers, being used, wherein first only ≥50% by weight of the total amount of the at least one RAFT compound, ≥10% by weight of the total amount of the at least one monomer A, ≤5% by weight of the total amount of the at least one monomer B, and ≤5% by weight of the total amount of the at least one free radical initiator are initially taken in the aqueous polymerization medium and thereafter any remaining residual amount of the at least one RAFT compound, any remaining residual amount of the at least one monomer A, the total amounts or any remaining residual amounts of the at least one monomer B and of the at least one free radical initiator are added under polymerization conditions and are polymerized.

The present invention likewise relates to the aqueous polymer dispersions obtainable by the process according to the invention, the polymer powders obtainable from these aqueous polymer dispersions and the use of the aqueous polymer dispersions and of the polymer powders in a very wide range of applications.

Polymerization processes with the use of RAFT compounds are familiar to the person skilled in the art (cf. in this context, for example, J. Kristina et al., Macromolecules 1995, 28, pages 5381 to 5385; M. J. Monteiro, J. Polym. Sci., Part A: Polym. Chem. 2005, 43, pages 3189 to 3204 or Moad et al., Aust. J. Chem. 2005, 58, pages 379 to 410). RAFT compounds generally act as reversible free radical chain regulators, with which the average molecular weight of the polymers can be adjusted in a targeted manner (cf. in this context, for example, Ch. Barner-Kowollik, Handbook of RAFT Polymerization 2008, Wiley-VCH, page 190). In addition, the polymers obtained have as a rule a narrow molecular weight distribution. Processes for the preparation of aqueous polymer dispersions from water-soluble and water-insoluble ethylenically unsaturated monomers with the use of RAFT compounds are sufficiently well known (cf. for example C. J. Fergusson et al., Macromolecules 2002, 35, pages 9243 to 9245; C. J. Fergusson et al., Macromolecules 2005, 38, pages 2191 to 2204 or WO 03/55919). As a rule, in a first polymerization stage, first a water-soluble ethylenically unsaturated monomer is subjected to free radical polymerization in the presence of the RAFT compound and thereafter, in a second polymerization stage, a water-insoluble ethylenically unsaturated monomer is likewise subjected to free radical polymerization in the presence of the polymer of the first polymerization stage. Block copolymers having a hydrophilic polymer block (from the water-soluble monomers) and a hydrophobic polymer block (from the water-insoluble monomers) and the fragments of the RAFT compound at both ends of the block copolymer form thereby. By the choice of the type and amount of the water-soluble and of the water-insoluble monomers, it is possible to adjust the hydrophilic and/or hydrophobic properties of the block copolymers in a targeted manner. Because the hydrophilic/hydrophobic properties can be adjusted in a targeted manner, the block copolymers obtained can advantageously be used as dispersants in free radical aqueous emulsion polymerization or in free radical aqueous suspension polymerization. A disadvantage of the process of the prior art is that the preparation of the corresponding block copolymers is very time-consuming since first the hydrophilic polymer block and then the hydrophobic polymer block are polymerized.

It was an object of the present invention to provide an alternative process for the preparation of copolymers having hydrophilic/hydrophobic properties adjustable in a targeted manner in an aqueous medium.

Surprisingly, the object was achieved by the process defined at the outset.

According to the invention, clear water, preferably drinking water and particularly preferably dionized water is used, the total amount of which is from 30 to 90% by weight and advantageously from 40 to 80% by weight, based in each case on the aqueous polymer dispersion obtained by the process according to the invention. What is important is that at least a portion, advantageously ≥40% by weight and particularly advantageously ≥70% by weight, of the total amount of water is initially taken as part of the aqueous polymerization medium in the polymerization vessel together with the RAFT compound. Any remaining residual amount of water can be fed to the polymerization medium during the polymerization reaction batchwise in one or more portions or continuously at constant or changing flow rates, frequently as part of an aqueous solution of the free radical initiator.

RAFT (reversible addition fragmentation chain transfer) compounds are sufficiently well known to the person skilled in the art (cf. for example WO 98/01478, WO 03/55919, U.S. Pat. No. 6,596,899, U.S. Pat. No. 6,569,969 and Chiefari et al., Macromolecules 2003, 36, pages 2273 to 2283). RAFT compounds are as a rule compounds which have the following fundamental structure:

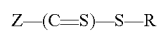

By free radical polymerization of a number n of ethylenically unsaturated monomer units X in the presence of an RAFT compound, polymers having the following structure are obtained:

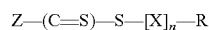

According to the invention, all RAFT compounds can be used. In particular, it is possible according to the invention to use the RAFT compounds disclosed in WO 98/01478 according to the formulae (C) and (D), in particular the compounds (3) to (29), and the RAFT compounds disclosed in WO 03/55919 according to (5), having the structural units Z and R', as defined on page 12, line 13 to page 17, line 16, in particular compounds (15) to (25), and the RAFT compounds disclosed in U.S. Pat. No. 6,596,899, in particular those disclosed in column 2, lines 38 to 64, which are incorporated in this document by virtue of express reference to them. In the process according to the invention, 2-(1-carboxy-1-methylethylsulfanylthiocarbonylsulfanyl)-2-methylpropionic acid [CAS No.: 355120-40-0, formula I], 2-butylsulfanylthiocarbonylsulfanylpropionic acid [CAS No.: 480436-46-2, formula II] and/or 3-(carboxyethylsulfanylthiocarbonyl)propionic acid [CAS No.: 15238-06-9, formula III] are particularly preferably used as RAFT compounds.

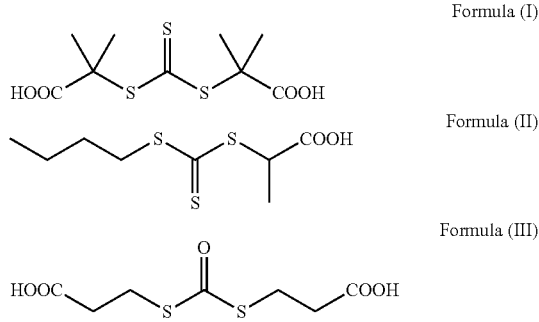

Formula (I)

Formula (II)

Formula (III)

Based on the total amount of monomers, the amount of RAFT compounds which is used according to the invention is ≥0.1 and ≤5% by weight, preferably ≥0.5 and ≤4% by weight and particularly preferably ≥1.5 and ≤3% by weight.

Suitable monomers A are in principle all those ethylenically unsaturated monomers which have a solubility of ≥200 g, preferably ≥300 g and particularly preferably ≥500 g per 1000 g of dionized water at 20° C. and 1 atm (absolute). Frequently, the monomers A have an unlimited solubility in dionized water. Suitable monomers A are in particular those ethylenically unsaturated monomers which have at least one acid group, in particular a carboxylic acid or sulfonic acid group, a hydroxyalkyl group, an amido group, an amino group, an ethyleneurea group, or an acetoacetoxy group. The monomers A are particularly advantageously selected from the group consisting of acrylic acid, methacrylic acid, 4-styrenesulfonic acid, 2-dimethylaminoethyl acrylate, 2-dimethylaminoethyl methacrylate, 2-acrylamido-2-methylpropanesulfonic acid (AMPS), vinylsulfonic acid, acrylamide, methacrylamide, N-(2-methacryloyloxyethyl)-ethyleneurea (UMA), N-(2-acryloyloxyethyl)ethyleneurea, 2-acetoacetoxyethyl acrylate, 2-acetoacetoxyethyl methacrylate (AAEM), diacetoneacrylamide (DAAM), 2-hydroxyethyl acrylate, 2- or 3-hydroxypropyl acrylate, 2-hydroxyethyl methacrylate and 2- or 3-hydroxypropyl methacrylate. Acrylic acid, methacrylic acid, acrylamide, 4-styrenesulfonic acid, 2-dimethylaminoethyl acrylate, 2-hydroxyethyl acrylate and/or 2-acrylamido-2-methylpropanesulfonic acid are particularly preferred. Of course, the monomers A also comprise the alkali metal or ammonium salts of the abovementioned monomers having an acid group, in particular a carboxylic or sulfonic acid group.

Suitable monomers B are all those ethylenically unsaturated monomers which have a solubility of ≤100 g, preferably ≤60 g and particularly preferably ≤20 g per 1000 g of dionized water at 20° C. and 1 atm (absolute).

In particular, ethylenically unsaturated compounds which can undergo free radical copolymerization in a simple manner with the monomers A are suitable as monomers B, such as, for example, olefins, such as ethylene or propylene, vinylaromatic monomers, such as styrene, α-methylstyrene, o-chlorostyrene or vinyltoluene, vinyl halides, such as vinyl chloride or vinylidene chloride, esters of vinyl alcohol and monocarboxylic acids having 1 to 18 carbon atoms, such as vinyl acetate, vinyl propionate, vinyl n-butyrate, vinyl laurate and vinyl stearate, esters of α,β-mono-ethylenically unsaturated mono- and dicarboxylic acids having preferably 3 to 6 carbon atoms, such as, in particular, acrylic acid, methacrylic acid, maleic acid, fumaric acid and itaconic acid, with in general alkanols having 1 to 12, preferably 1 to 8 and in particular 1 to 4 carbon atoms, such as, in particular, methyl, ethyl, n-butyl, isobutyl, pentyl, hexyl, heptyl, octyl, nonyl, decyl and 2-ethylhexyl acrylate and methacrylate, dimethyl or di-n-butyl fumarate or maleate, nitriles of α,β-monoethylenically unsaturated carboxylic acids, such as acrylonitrile, methacrylonitrile, fumaronitrile, maleonitrile, and conjugated $C_{4-8}$-dienes, such as 1,3-butadiene (butadiene) and isoprene. Said monomers form as a rule the main monomers which, based on the total amount of monomers B, together account for a proportion of ≥70% by weight, preferably ≥90% by weight and particularly preferably ≥95% by weight or even form the total amount of the monomers B.

Monomers B, which usually increase the internal strength of the films of a polymer matrix of the polymer particles, usually have at least one epoxy group or at least two nonconjugated ethylenically unsaturated double bonds. Examples of these are monomers having two vinyl radicals, monomers having two vinylidene radicals and monomers having two alkenyl radicals. Particularly advantageous are the diesters of dihydric alcohols with α,β-monoethylenically unsaturated monocarboxylic acids, among which acrylic and methacrylic acid are preferred. Examples of such monomers having two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and divinylbenzene, vinyl methacrylate, vinyl acrylate, allyl methacrylate, allyl acrylate, diallyl maleate, diallyl fumarate, cyclopentadienyl acrylate, triallyl cyanurate or triallyl isocyanurate. Advantageously, the abovementioned crosslinking monomers B are used in amounts of ≤30% by weight, but preferably in amounts of ≤10% by weight, based in each case on the total amount of monomers B. Frequently, however, no such crosslinking monomers B at all are used.

Particularly advantageously, the main amounts or the total amounts of monomers B are selected from the group consisting of methyl acrylate, ethyl acrylate, n-butyl acrylate, tert-butyl acrylate, 2-ethylhexyl acrylate, 2-propylheptyl acrylate, methyl methacrylate, ethyl methacrylate, n-butyl methacrylate, tert-butyl methacrylate, 2-ethylhexyl methacrylate, 2-propylheptyl methacrylate, 2-phenoxyethyl acrylate, styrene, vinyltoluene, 2-methylstyrene, 4-methylstyrene, 2-n-butylstyrene, 4-n-butylstyrene, 4-n-decylstyrene, vinyl acetate, vinyl propionate, acrylonitrile and methacrylonitrile.

In the process according to the invention, the total amount of monomers A is ≥1 and ≤80% by weight, advantageously ≥15 and ≤70% by weight and particularly advantageously ≥25 and ≤60% by weight and accordingly the total amount of monomers B is ≥20 and ≤99% by weight, advantageously ≥30 and ≤85% by weight and particularly advantageously ≥40 and ≤75% by weight, the amounts of monomers A and of monomers B summing to 100% by weight.

The initiation of the free radical polymerization reaction is effected by means of a free radical polymerization initiator (free radical initiator). Said initiators can in principle be either peroxides or azo compounds. Of course, redox initiator systems are also suitable. Peroxides used can in principle be inorganic peroxides, such as hydrogen peroxide or peroxodisulfates, such as mono- or dialkali metal or ammonium salts of peroxodisulfuric acid, such as, for example, the mono- and disodium, mono- and dipotassium or ammonium salts thereof, or organic peroxides, such as alkyl hydroperoxides, for example tert-butyl, p-menthyl or cumyl hydroperoxide, and dialkyl or diaryl peroxides, such as di-tert-butyl or dicumyl peroxide. Azo compounds used are substantially 2,2'-azobis(isobutyronitrile), 2,2'-azobis(2,4-dimethylvaleronitrile) and 2,2'-azobis(amidinopropyl) dihydrochloride (AIBA, corresponds to V-50 from Wako Chemicals). Suitable oxidizing agents for redox initiator systems are substantially the abovementioned peroxides. Sulfur compounds having a low oxidation state, such as alkali metal sulfites, for example potassium and/or sodium sulfite, alkali metal bisulfites, for example potassium and/or sodium bisulfite, alkali metal metabisulfites, for example potassium and/or sodium metabisulfite, formaldehyde sulfoxylates, for example potassium and/or sodium formaldehyde sulfoxylate, alkali metal salts, especially potassium and/or sodium salts of aliphatic sulfinic acids and alkali metal hydrogen sulfides, such as, for example, potassium and/or sodium hydrogen sulfide, salts of polyvalent metals, such as iron(II) sulfate, iron(II) ammonium sulfate, iron(II) phosphate, enediols, such as dihydroxymaleic acid, benzoin and/or ascorbic acid and reducing saccharides, such as sorbose, glucose, fructose and/or dihydroxyacetone, can be used as corresponding reducing agents. According to the invention, the amount of the free radical initiator used, based on the total amount of monomers, is $\geq 0.01$ and $\leq 5\%$ by weight, preferably $\geq 0.1$ and $\leq 4\%$ by weight and particularly preferably $\geq 0.3$ and $\leq 2\%$ by weight.

What is essential to the process is that first only $\geq 50\%$ by weight of the total amount of the at least one RAFT compound, $\geq 10\%$ by weight of the total amount of the at least one monomer A, $\leq 5\%$ by weight of the total amount of the at least one monomer B and $\leq 5\%$ by weight of the total amount of the at least one free radical initiator are initially taken in an aqueous polymerization medium and thereafter any remaining residual amount of the at least one RAFT compound, any remaining residual amount of the at least one monomer A, the total amounts or any remaining residual amounts of the at least one monomer B and of the at least one free radical initiator are added under polymerization conditions and are polymerized.

Advantageously $\geq 80\%$ by weight, particularly advantageously $\geq 90\%$ by weight, of the total amount and preferably the total amount of the at least one RAFT compound, $\geq 50\%$ by weight, particularly advantageously $\geq 90\%$ by weight, of the total amount and preferably the total amount of the at least one monomer A, $\leq 5\%$ by weight, particularly advantageously $\leq 1\%$ by weight, of the total amount of the at least one monomer B, but preferably no monomers B at all, and $\leq 5\%$ by weight, particularly advantageously $\leq 1\%$ by weight, of the total amount of the at least one free radical initiator, but preferably no free radical initiator at all, are initially taken in the aqueous polymerization medium. If a free radical initiator is likewise initially taken in the aqueous polymerization medium, the type and amount of the free radical initiator and temperature or pressure conditions in the initially taken mixture are chosen so that no polymerization reaction is initiated (i.e. for example the half-lives of the free radical initiator are >5 hours).

Thereafter, any remaining residual amount of the at least one RAFT compound, any remaining residual amount of the at least one monomer A, the total amounts or any remaining residual amounts of the at least one monomer B and of the at least one free radical initiator are added under polymerization conditions and are polymerized. The RAFT compounds, monomers A, the monomers B and the free radical initiators can be fed to the aqueous polymerization medium in each case batchwise in one or more portions or continuously at constant or changing flow rates. Advantageously, any remaining residual amount of the at least one RAFT compound, any remaining residual amount of the at least one monomer A, the total amounts or any remaining residual amounts of the at least one monomer B and of the at least one free radical initiator are added continuously, in particular at constant flow rates, under polymerization conditions.

If both any remaining residual amount of at least one monomer A and the total amount or any remaining residual amount of the at least one monomer B are added to the aqueous polymerization medium under polymerization conditions, the addition thereof is advantageously effected in such a way that the metering time of any remaining residual amount of the at least one monomer A is $\leq 50\%$, particularly advantageously $\leq 30\%$, of the metering time of the total amount or of any remaining residual amount of the at least one monomer B.

Polymerization conditions are generally understood as meaning those temperatures and pressures at which the free radical aqueous emulsion polymerization takes place at a sufficient polymerization rate. They are in particular dependent on the free radical initiator used. The type and amount of the free radical initiator, polymerization temperature and polymerization pressure are advantageously chosen so that sufficient initiating free radicals are always available for initiating or maintaining the polymerization reaction. In particular, the polymerization temperature and the polymerization pressure are chosen so that the half-life of the free radical initiator used is $\leq 3$ hours, advantageously $\leq 1$ hour and particularly advantageously $\leq 30$ minutes.

The entire range from 0 to 170° C. is suitable as a reaction temperature for the free radical aqueous emulsion polymerization according to the invention. As a rule, temperatures of from 50 to 120° C., frequently from 60 to 110° C. and often from 70 to 100° C. are used. The free radical aqueous emulsion polymerization according to the invention can be carried out at a pressure of less than, equal to or greater than 1 atm [1.013 bar (absolute), atmospheric pressure], so that the polymerization temperature may exceed 100° C. and may be up to 170° C. Preferably, readily volatile monomers, such as, for example, ethylene, butadiene or vinyl chloride, are polymerized under superatmospheric pressure. The pressure may be 1.2, 1.5, 2, 5, 10 or 15 bar (absolute) or may assume even higher values. If emulsion polymerizations are carried out at reduced pressure, pressures of 950 mbar, frequently of 900 mbar and often of 850 mbar (absolute) are established. The free radical aqueous emulsion polymerization according to the invention is advantageously carried out at 1 atm in the absence of oxygen, for example under an inert gas atmosphere, such as, for example, under nitrogen or argon.

The aqueous reaction medium can advantageously additionally comprise $\geq 0.1$ and $\leq 20\%$ by weight, preferably $\geq 1$ and $\leq 15\%$ by weight and particularly preferably $\geq 3$ and $\leq 10\%$ by weight of an organic solvent having a solubility of $\geq 200$ g per 1000 g of dionized water at 20° C. and 1 atm (absolute), based on the total amount of water in the aqueous polymer dispersion. What is important in the use, according to the invention, of an organic solvent is that at least a portion, advantageously ≥50% by weight and particularly advantageously 80% by weight of the total amount or the total amount of organic solvent, is initially taken as part of the aqueous polymerization medium in the polymerization vessel together with the RAFT compound. Any remaining residual amount of organic solvent can be fed to the polymerization medium batchwise in one or more portions or continuously at constant or changing flow rates during the polymerization reaction.

Aliphatic $C_1$- to $C_5$-alcohols, such as methanol, ethanol, n-propanol, isopropanol, n-butanol and the isomeric compounds thereof, n-pentanol and the isomeric compounds thereof, etc., aliphatic $C_3$- to $C_4$-ketones, such as acetone or ethyl methyl ketone, and cyclic ethers, such as tetrahydrofuran or dioxane, may be mentioned by way of example as suitable organic solvents.

According to the invention, customary dispersants, such as emulsifiers and/or protective colloids, can optionally also be used in amounts of from 0.1 to 10% by weight, based on the total amount of monomers. Advantageously, however, the process according to the invention is carried out without the corresponding dispersants.

Particularly advantageously, the process according to the invention is effected in such a way that the monomers A and B are reacted under polymerization conditions up to a conversion of ≥95% by weight, advantageously ≥98% by weight and particularly advantageously ≥99% by weight. It is frequently advantageous if the aqueous polymer dispersion obtained after the end of the polymerization is subjected to an aftertreatment for reducing the residual monomer content. The aftertreatment is effected either chemically, for example by completion of the polymerization reaction by use of a more effective free radical initiator system (so-called postpolymerization) and/or physically, for example by stripping of the aqueous polymer dispersion with steam or inert gas. Corresponding chemical and/or physical methods are familiar to the person skilled in the art [cf. for example EP-A 771328, DE-A 19624299, DE-A 19621027, DE-A 19741184, DE-A 19741187, DE-A 19805122, DE-A 19828183, DE-A 19839199, DE-A 19840586 and 19847115]. The combination of chemical and physical aftertreatment has the advantage that, as well as the unreacted ethylenically unsaturated monomers, other troublesome readily volatile organic constituents (the so-called VOCs [volatile organic compounds]) are also removed from the aqueous polymer dispersion.

By targeted variation of the type and amount of the monomers A and B, it is possible according to the invention for the person skilled in the art to prepare aqueous polymer dispersions whose polymers have a glass transition temperature or a melting point in the range of from −60 to 270° C. Of course, step or multiphase polymers having a plurality of glass transition temperatures can also be prepared. Depending on the planned use of the aqueous polymer dispersions, polymers which have at least one polymer phase whose glass transition temperature is ≥−60 and ≤10° C. (adhesives), ≥10 and ≤100° C. (binders for coating formulations) or ≥80° C. (hard paint films) are prepared.

The glass transition temperature $T_g$ means the limit of the glass transition temperature toward which it tends according to G. Kanig (Kolloid-Zeitschrift & Zeitschrift für Polymere, vol. 190, page 1, equation 1) with increasing molecular weight. The glass transition temperature or the melting point is determined by the DSC method (Differential Scanning calorimetry, 20 K/min, midpoint measurement, DIN 53765).

According to Fox (T. G. Fox, Bull. Am. Phys. Soc. 1956 [Ser. II] 1, page 123, and according to Ullmann's Encyclopädie der technischen Chemie, vol. 19, page 18, 4th edition, Verlag Chemie, Weinheim, 1980), the following is a good approximation for the glass transition temperature of at most weakly crosslinked copolymers:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures, in degrees Kelvin, of the polymers composed in each case only of one of the monomers 1, 2, ... n. The $T_g$ values for the homopolymers of most monomers are known and are mentioned, for example, in Ullmann's Encyclopedia of Industrial Chemistry, Part 5, Vol. A21, page 169, VCH Weinheim, 1992; further sources of glass transition temperatures of homopolymers are, for example, J. Brandrup, E. H. Immergut, Polymer Handbook, $1^{st}$ Ed., J. Wiley, New York 1966, $2^{nd}$ Ed. J. Wiley, New York 1975, and $3^{rd}$ Ed. J. Wiley, New York 1989).

The aqueous polymer dispersions obtained according to the invention usually have polymer solids contents of ≥10 and ≤70% by weight, frequently ≥15 and ≤65% by weight and often ≥20 and ≤60% by weight, based in each case on the aqueous polymer composition.

The number average particle diameter of the polymer dispersions obtained (cumulant z-average), determined via quasielastic light scattering (ISO standard 13 321), is as a rule from 5 to 1000 nm, frequently from 10 to 500 nm and often from 15 to 200 nm. In exceptional cases (high proportion of monomers A and low proportion of monomers B), the polymers obtainable by the process according to the invention may also be present in solution in the aqueous polymerization medium. The corresponding polymer solutions are also to be subsumed under the term "aqueous polymer dispersion".

The hydrophilic/hydrophobic properties of the polymers obtainable by the process according to the invention can be adjusted in a targeted manner by the choice of the type and amounts of the monomers A and B. These polymers are therefore advantageously suitable as tailor-made dispersants in free radical aqueous emulsion polymerization or in free radical aqueous suspension polymerization.

Of course, the aqueous polymer dispersions according to the invention which are obtainable by the process according to the invention can be used as a component in the production of adhesives, sealant compounds, plastics renders, paper coating slips, fiber webs, paints and coating materials for organic substrates and for modifying mineral binders and plastics.

Furthermore, the corresponding polymer powders are obtainable in a simple manner (for example by freeze drying or spray drying) from the aqueous polymer dispersions according to the invention. These polymer powders obtainable according to the invention can likewise be used as a component in the production of adhesives, sealing compounds, plastics renders, paper coating slips, fiber webs, paints and coating materials for organic substrates and for modifying mineral binders and plastics.

The preparation of the aqueous polymer dispersions by the process according to the invention moreover has the advantage that the polymerization times are substantially shorter than in the case of the known processes for the preparation of the corresponding block copolymers. In addition, the aqueous polymer dispersions obtainable by the process according to the invention have a substantially lower proportion of soluble components.

The invention is to be illustrated with reference to the following non-limiting examples.

EXAMPLES

Example 1

1035 g of dionized water, 113 g of acrylic acid, 7.5 g of 2-(1-carboxy-1-methyl-ethylsulfanylthiocarbonylsulfanyl)-2-methylpropionic acid, and 60 g of acetone were initially taken at from 20 to 25° C. (room temperature) and under a nitrogen atmosphere in a 2 l four-necked flask equipped with an anchor stirrer, reflux condenser and metering apparatuses and were heated to 85° C. with stirring. After 83° C. had been reached, 4.0 g of a 7% strength by weight aqueous solution of sodium persulfate and 4.5 g of dionized water were added and the solution obtained was stirred for 20 minutes at 85° C. Thereafter, the monomer feed consisting of 263 g of styrene and the initiator feed consisting of 26 g of dionized water and 23 g of a 7% strength by weight aqueous solution of sodium persulfate were started at the same time and the monomer feed was metered in continuously in 3 hours and the initiator feed in 4 hours at constant flow rates. The aqueous polymer dispersion obtained was then allowed to react for a further 2 hours at 85° C. The aqueous polymer dispersion obtained had a solids content of 25% by weight, based on the total weight of the aqueous dispersion. The mean particle size of the polymer particles was 39 nm. The content of water-soluble constituents in the aqueous polymer dispersion was 1.1% by weight, based on the aqueous polymer dispersion.

The solids content was determined in general by drying about 1 g of the aqueous polymer dispersion in an open aluminum crucible having an internal diameter of about 3 cm in a drying oven at 150° C. to constant weight. For determining the solids content, in each case two separate measurements were carried out and the corresponding mean value was calculated.

The determination of the mean particle size of the polymer particles was effected in general by the quasielastic light scattering method (DIN-ISO 13321) using a High Performance Particle Sizer (HPPS) from Malvern Instruments Ltd.

The content of water-soluble constituents in the aqueous polymer dispersion was determined in general by centrifuging about 40 g of the aqueous polymer dispersion for 180 minutes at 50 000 revolutions per minute and the removing about 2 g of the clear aqueous solution present above the polymer and drying it in an open aluminum crucible having an internal diameter of about 3 cm in a drying oven at 150° C. to constant weight.

Example 2

The preparation of example 2 was effected analogously to example 1, except that only 5.5 g of 2-(1-carboxy-1-methylethylsulfanylthiocarbonylsulfanyl)-2-methylpropionic acid and 44 g of acetone were initially taken and 2.0 g of 2-(1-carboxy-1-methylethylsulfanylthiocarbonylsulfanyl)-2-methylpropionic acid, dissolved in 16 g of acetone, were metered in simultaneously with the monomer feed at a constant flow rate.

The aqueous polymer dispersion obtained had a solids content of 24.8% by weight, based on the total weight of the aqueous dispersion. The mean particle size of the polymer particles was 60 nm. The content of water-soluble constituents in the aqueous polymer dispersion was 1.5% by weight, based on the aqueous polymer dispersion.

Example 3

The preparation of example 3 was effected analogously to example 1, except that 7.5 g of 2-butylsulfanylthiocarbonylsulfanylpropionic acid were used instead of 7.5 g of 2-(1-carboxy-1-methylethylsulfanylthiocarbonylsulfanyl)-2-methylpropionic acid.

The aqueous polymer dispersion obtained had a solids content of 25.1% by weight, based on the total weight of the aqueous dispersion. The mean particle size of the polymer particles was 24 nm. The content of water-soluble constituents in the aqueous polymer dispersion was 1.1% by weight, based on the aqueous polymer dispersion.

Example 4

The preparation of example 4 was effected analogously to example 1, except that 7.5 g of 3-(carboxyethylsulfanylthiocarbonyl)propionic acid were used instead of 7.5 g of 2-(1-carboxy-1-methylethylsulfanylthiocarbonylsulfanyl)-2-methylpropionic acid.

The aqueous polymer dispersion obtained had a solids content of 24.7% by weight, based on the total weight of the aqueous dispersion. The mean particle size of the polymer particles was 35 nm. The content of water-soluble constituents in the aqueous polymer dispersion was 1.3% by weight, based on the aqueous polymer dispersion.

Example 5

The preparation of example 5 was effected analogously to example 1, except that only 20 g of acrylic acid were initially taken and 93 g of acrylic acid were metered in simultaneously with the monomer feed.

The aqueous polymer dispersion obtained had a solids content of 24.9% by weight, based on the total weight of the aqueous dispersion. The mean particle size of the polymer particles was 100 nm. The content of water-soluble constituents in the aqueous polymer dispersion was 3.5% by weight, based on the aqueous polymer dispersion.

Example 6

The preparation of example 6 was effected analogously to example 5, except that 93 g of acrylic acid were metered in over the course of one hour at a constant flow rate.

The aqueous polymer dispersion obtained had a solids content of 25.2% by weight, based on the total weight of the aqueous dispersion. The mean particle size of the polymer particles was 60 nm. The content of water-soluble constituents in the aqueous polymer dispersion was 2.1% by weight, based on the aqueous polymer dispersion.

Example 7

The preparation of example 7 was effected analogously to example 1, except that a mixture of 257 g of styrene and 6 g of divinylbenzene (isomer mixture from Sigma-Aldrich) was used instead of 263 g of styrene.

The aqueous polymer dispersion obtained had a solids content of 25.3% by weight, based on the total weight of the aqueous dispersion. The mean particle size of the polymer particles was 44 nm. The content of water-soluble constituents in the aqueous polymer dispersion was 1.3% by weight, based on the aqueous polymer dispersion.

Example 8

The preparation of example 8 was effected analogously to example 1, except that 263 g of n-butyl acrylate were used instead of 263 g of styrene.

The aqueous polymer dispersion obtained had a solids content of 24.8% by weight, based on the total weight of the aqueous dispersion. The mean particle size of the polymer particles was 49 nm. The content of water-soluble constituents in the aqueous polymer dispersion was 1.1% by weight, based on the aqueous polymer dispersion.

Example 9

The preparation of example 9 was effected analogously to example 1, except that 113 g of 4-styrenesulfonic acid were used instead of 113 g of acrylic acid.

The aqueous polymer dispersion obtained had a solids content of 24.9% by weight, based on the total weight of the aqueous dispersion. The mean particle size of the polymer particles was 35 nm. The content of water-soluble constituents in the aqueous polymer dispersion was 1.0% by weight, based on the aqueous polymer dispersion.

Comparative Example 1

The preparation of comparative example 1 was effected analogously to example 2, except that only 0.5 g of 2-(1-carboxy-1-methylethylsulfanylthiocarbonylsulfanyl)-2-methylpropionic acid and 4 g of acetone were initially taken and 7.0 g of 2-(1-carboxy-1-methylethylsulfanylthiocarbonylsulfanyl)-2-methylpropionic acid, dissolved in 56 g of acetone, were metered in simultaneously with the monomer feed at a constant flow rate.

The highly viscous aqueous polymer dispersion obtained had a solids content of 25.4% by weight, based on the total weight of the aqueous dispersion. The mean particle size of the polymer particles was outside the regular range of measurement [nonuniform data were obtained: 1.7 μm or 3.0 μm]. Owing to the high viscosity, the content of water-soluble constituents in the aqueous polymer dispersion could not be determined.

Comparative Example 2

The preparation of comparative example 2 was effected analogously to example 2, except that only 2.0 g of 2-(1-carboxy-1-methylethylsulfanylthiocarbonylsulfanyl)-2-methylpropionic acid and 16 g of acetone were initially taken and 5.5 g of 2-(1-carboxy-1-methylethylsulfanylthiocarbonylsulfanyl)-2-methylpropionic acid, dissolved in 44 g of acetone, were metered in simultaneously with the monomer feed at a constant flow rate.

The aqueous polymer dispersion obtained had a solids content of 24.8% by weight, based on the total weight of the aqueous dispersion. The aqueous polymer dispersion obtained was polymodal and had three clearly defined maxima (about 70 nm, about 320 nm and about 4.6 μm). The content of water-soluble constituents in the aqueous polymer dispersion was 7.9% by weight, based on the aqueous polymer dispersion.

We claim:
1. A process, comprising
free radical polymerizing ethylenically unsaturated monomers in the presence of at least one free radical initiator and at least one RAFT compound in an aqueous polymerization medium to obtain an aqueous polymer dispersion,
wherein
(A) ≥1 and ≤80% by weight of at least one ethylenically unsaturated monomer A having a solubility of ≥200 g per 1000 g of deionized water at 20° C. and 1 atm (absolute), and
(B) ≥20 and ≤99% by weight of at least one ethylenically unsaturated monomer B having a solubility of ≤100 g per 1000 g of deionized water at 20 ° C. and 1 atm (absolute)
are polymerized in the polymerizing and A and B sum to 100% by weight, which is a total amount of monomers, wherein
(C) ≥0.1 and ≤5% by weight, based on the total amount of monomers, of at least one RAFT compound and
(D) ≥0.01 and ≤5% by weight of at least one free radical initiator, based on the total amount of monomers,
are present during said free radical polymerizing, wherein first only
≥73.3% by weight of a total amount of the at least one RAFT compound, the total amount of the at least one monomer A,
≤5% by weight of a total amount of the at least one free radical initiator, and
no monomer B
are present in the aqueous polymerization medium before said free radical polymerizing is carried out, and, after said free radical polymerizing has commenced, the process further comprises adding any remaining residual amount of the at least one RAFT compound, the total amount of the at least one monomer B and of the at least one free radical initiator under polymerization conditions and polymerizing the added monomers.

2. The process according to claim 1, wherein said adding is continuously adding any remaining residual amount of the at least one RAFT compound, a total amount of the at least one monomer B and of the at least one free radical initiator under polymerization conditions.

3. The process according to claim 1, wherein the total amount of the at least one RAFT compound is present in the aqueous polymerization medium before said free radical polymerizing is carried out.

4. The process according to claim 1, wherein the aqueous polymerization medium further comprises ≥0.1 and ≤20% by weight of an organic solvent having a solubility of ≥200 g per 1000 g of deionized water at 20° C. and 1 atm (absolute), based on a total amount of water in the aqueous polymer dispersion.

5. The process according to claim 1, wherein the at least one monomer A is selected from the group consisting of acrylic acid, methacrylic acid, acrylamide, 4-styrenesulfonic acid, 2-dimethylaminoethyl acrylate, 2-hydroxyethyl acrylate, and 2-acrylamido-2-methylpropanesulfonic acid.

6. The process according to claim 1, wherein the at least one monomer B is selected from the group consisting of methyl acrylate, ethyl acrylate, n-butyl acrylate, tert-butyl acrylate, 2-ethylhexyl acrylate, 2-propylheptyl acrylate, methyl methacrylate, ethyl methacrylate, n-butyl methacrylate, tert-butyl methacrylate, 2-ethylhexyl methacrylate, 2-propylheptyl methacrylate, 2-phenoxyethyl acrylate, styrene, vinyltoluene, 2-methylstyrene, 4-methylstyrene, 2-n-butylstyrene, 4-n-butylstyrene, 4-n-decylstyrene, vinyl acetate, vinyl propionate, acrylonitrile, and methacrylonitrile.

7. The process according to claim 2, wherein the total amount of the at least one RAFT compound is present in the aqueous polymerization medium before said free radical polymerizing is carried out.

8. The process according to claim 2, wherein the aqueous polymerization medium further comprises ≥0.1 and ≤20% by weight of an organic solvent having a solubility of ≥200 g per 1000 g of deionized water at 20° C. and 1 atm (absolute), based on a total amount of water in the aqueous polymer dispersion.

9. The process according to claim 3, wherein the aqueous polymerization medium further comprises ≥0.1 and ≤20% by weight of an organic solvent having a solubility of ≥200 g per 1000 g of deionized water at 20° C. and 1 atm (absolute), based on a total amount of water in the aqueous polymer dispersion.

10. The process according to claim 7, wherein the aqueous polymerization medium further comprises ≥0.1 and ≤20% by weight of an organic solvent having a solubility of ≥200 g per 1000 g of deionized water at 20° C. and 1 atm (absolute), based on a total amount of water in the aqueous polymer dispersion.

11. The process according to claim 3, wherein the polymer present in the aqueous polymer dispersion is present in the form of a polymer particles having a mean particle size of no greater than 49 nm.

12. The process according to claim 1, wherein the polymer of the aqueous polymer dispersion obtained by said free radical polymerizing is a gradient copolymer.

13. The process according to claim 1, wherein the aqueous reaction medium comprises ≥3 and ≤10% by weight of an organic solvent having a solubility of ≥200 g per 1000 g of deionized water at 20° C. and 1 atm (absolute), based on the total amount of water in the aqueous polymer dispersion.

\* \* \* \* \*